April 11, 1967 R. C. MINNICK 3,313,926
MICROELECTRONIC CELLULAR ARRAY
Filed April 26, 1965 6 Sheets-Sheet 1
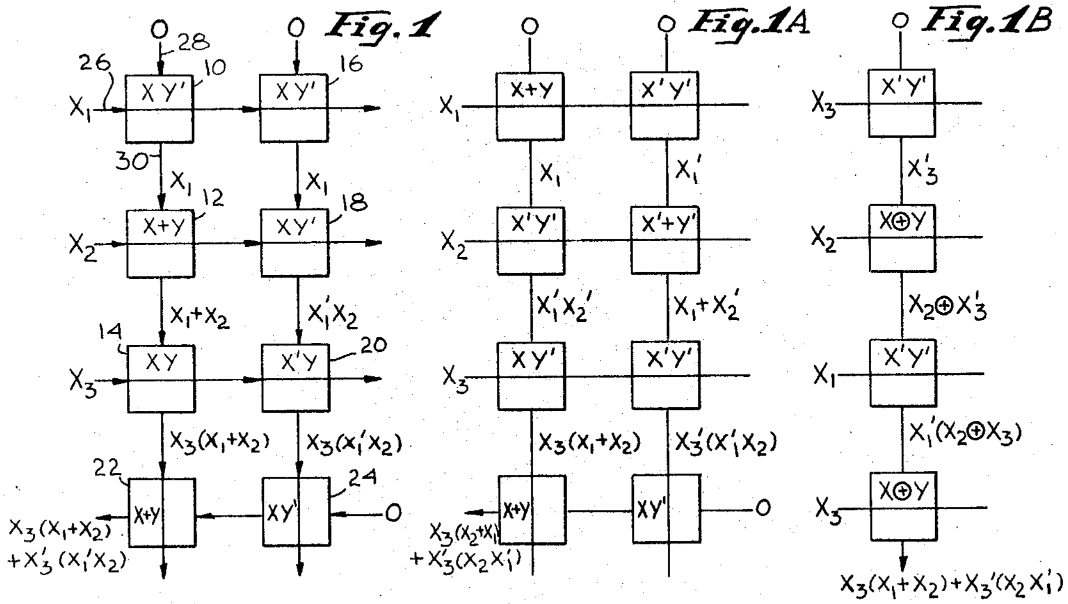
Fig. 1 Fig. 1A Fig. 1B
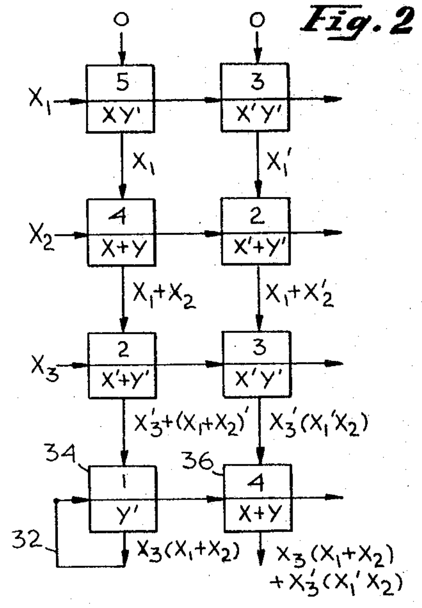
Fig. 2
| | OUTPUT FUNCTION |
|---|---|
| 0 | 1 |
| 1 | Y' |
| 2 | X'+Y' |
| 3 | X' Y' |
| 4 | X+Y |
| 5 | X Y' |
| 6 | X⊕Y |
| 7 | 0 |
Fig. 3
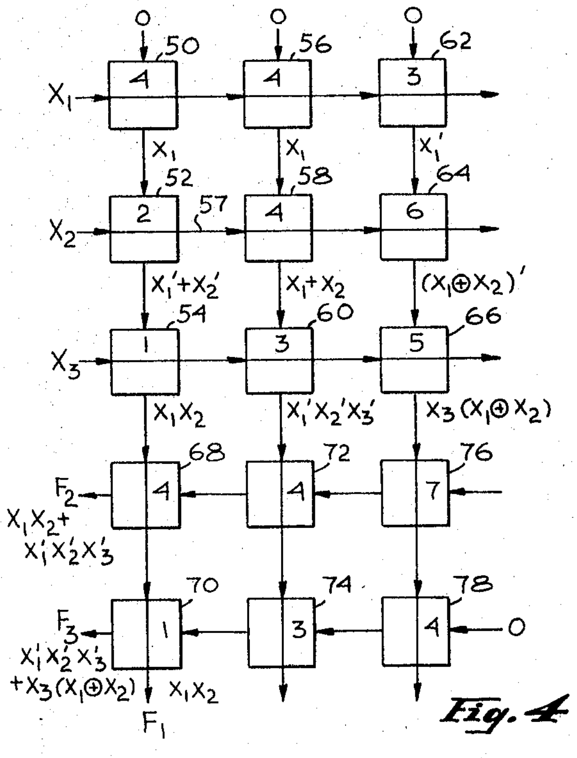
Fig. 4
INVENTOR
ROBERT C. MINNICK
BY Samuel Lindenberg
ATTORNEY April 11, 1967 R. C. MINNICK 3,313,926

MICROELECTRONIC CELLULAR ARRAY

Filed April 26, 1965 6 Sheets-Sheet 2

INVENTOR
ROBERT C. MINNICK
BY Samuel Lindenberg
ATTORNEY

Fig. 9
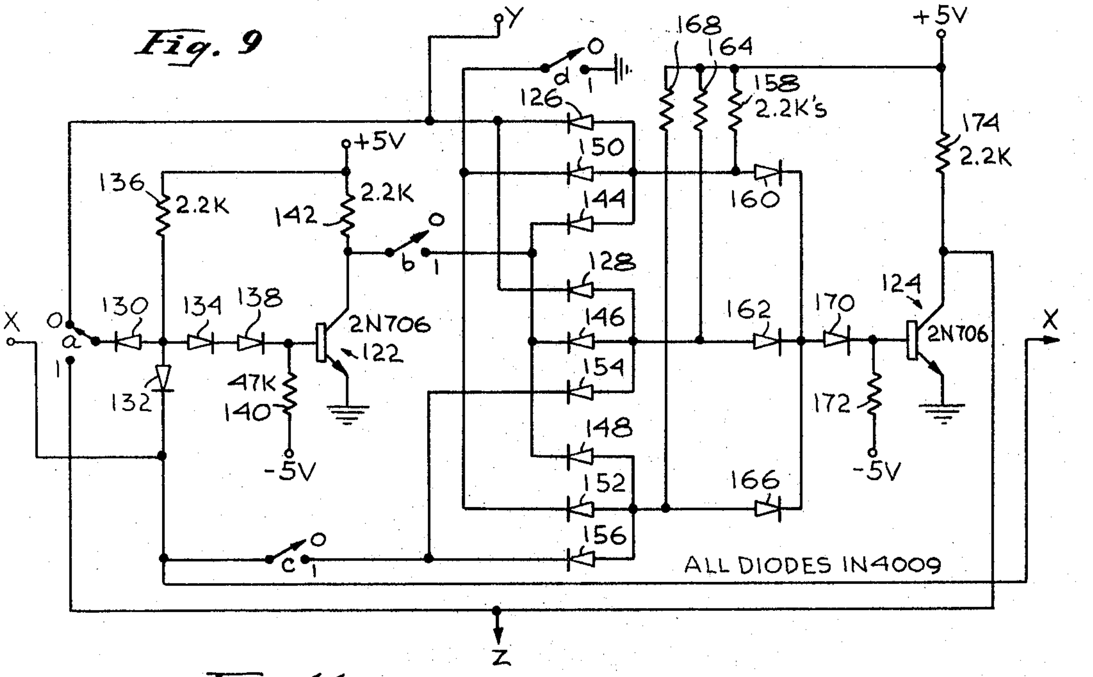
Fig. 11
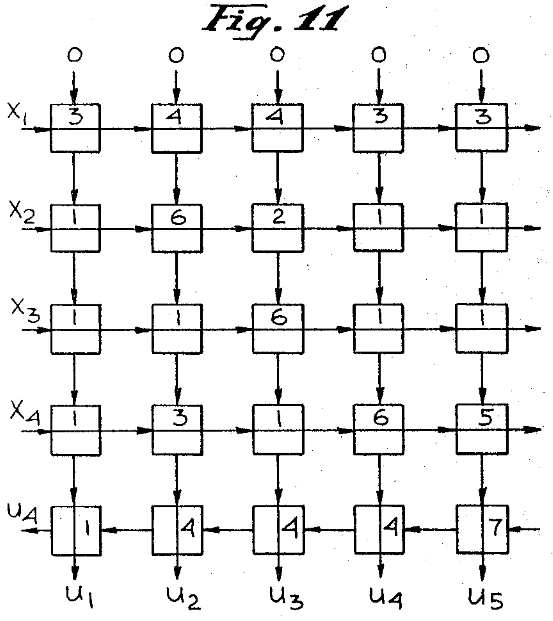
Fig. 12
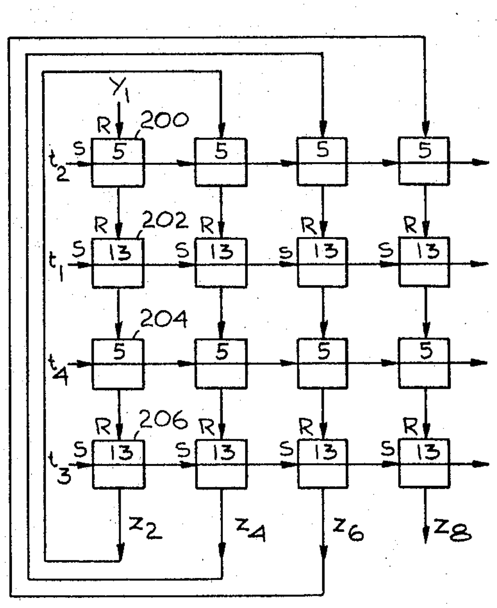
| STATE | a | b | c | d | Z |
|---|---|---|---|---|---|
| 0 | 0 | 0 | 0 | 0 | 1 |
| 1 | 0 | 0 | 0 | 1 | Y' |
| 2 | 0 | 0 | 1 | 0 | X' + Y' |
| 3 | 0 | 0 | 1 | 1 | X' Y' |
| 4 | 0 | 1 | 0 | 0 | X + Y |
| 5 | 0 | 1 | 0 | 1 | XY' |
| 6 | 0 | 1 | 1 | 0 | X⊕Y |
| 7 | 0 | 1 | 1 | 1 | 0 |
| 13 | 1 | 1 | 0 | 1 | X=S, Y=R |
Fig. 10
INVENTOR
ROBERT C. MINNICK
BY Samuel Lindenberg
ATTORNEY INVENTOR
ROBERT C. MINNICK
BY Samuel Lindenberg
Abraham Wasserman
ATTORNEYS INVENTOR
ROBERT C. MINNICK
BY Samuel Lindenberg
Abraham Wasserman
ATTORNEYS INVENTOR
ROBERT C. MINNICK
BY Samuel Lindenberg
Abraham Wasserman
ATTORNEYS

United States Patent Office 3,313,926
Patented Apr. 11, 1967

3,313,926

MICROELECTRONIC CELLULAR ARRAY

Robert C. Minnick, Redwood City, Calif., assignor to Stanford Research Institute, Menlo Park, Calif., a corporation of California Filed Apr. 26, 1965, Ser. No. 453,872
25 Claims. (Cl. 235—175)

This invention relates to computer logic and storage devices and more particularly to improvements therein.

This application is a continuation-in-part of application Serial No. 390,113, filed August 17, 1964 by the applicant of the present application, and assigned to the same assignee.

Many devices, such as binary digital computers, employ large numbers of interconnected logic and storage cells. The design and construction of a large, interconnected arrangement of cells is generally facilitated by grouping the cells in individual arrays of intermediate complexity. The use of arrays of intermediate complexity is especially desirable where microelectronic or integrated circuit techniques are employed, since many cells may easily be manufactured as a unit.

The use of cellular arrays is made very simple and economical where one or a few standard arrays may be constructed, which can be altered in a simple manner to perform any one of a variety of intermediate functions. Inasmuch as each standard array contains many individual elements, it can happen that a high proportion of arrays can contain defective cells. Accordingly, it is especially desirable to provide means whereby an array of such cells can be made to function despite the existence of one or more defective cells therein, especially where the defect is not apparent until after the array is altered so as to produce a particular function.

Accordingly, one object of the present invention is to provide a standard array of cells for producing an output which is a function of several inputs, wherein the individual cells thereof may be readily altered to change the function-producing characteristics of the array.

Another object of the invention is to provide a cellular array of logic and/or storage elements, which is capable of functioning in spite of one or more defective cells therein.

Still another obpect is to provide an array of logic cells wherein each cell is individually alterable so as to cause the array to produce any one of a large number of logic functions.

Still another object is to provide a two-dimensional array of logic cells for producing an arbitrary function of independent variables, which includes no more than $(n+1)2^{n-2}$ individual cells, excluding spare cells used to assure operation in case of defects therein.

Yet another object is to provide a cellular array wherein each cell may be altered in a simple and reliable manner to cause the array to produce any one of many functions.

A further object of the invention is to provide an array of logic cells wherein each cell which may be conveniently altered to produce a selected function, is selectively connected to surrounding cells in order to cause the array to produce any one of many functions with a minimum of cells.

Still a further object is to provide an array of interconnected logic cells wherein each cell, individually alterable to produce any one of a group of functions, is individually insulatable from the surrounding cells.

These and other objects of the invention are generally obtained by an arrangement of binary logic cells in rows and columns, forming an array. Each cell which includes a plurality of input ports and an output port also incorporates an arrangement to control its performance so that it produces a selected binary logic function from a predetermined set of functions. By properly choosing the function to be performed by each cell in the array, any desired output function may be obtained therefrom.

In one embodiment of the invention, each cell in the array has one input port directly connected (bussed) to the input ports of the other cells in the same row; another input port of each cell is connected to the output port of a preceding cell in the same column; i.e. the cells in the columns are series connected. The cells may be placed in physical arrangements other than columns and rows, but are generally connected so that operationally they constitute columns and rows; i.e. they form functional columns and rows.

The cellular array is constructed so that it may function despite having one or more defective cells, by including one or more rows and columns of spare cells therein. The spare cells generally have no affect on the functioning of the array. However, if a defective cell is discovered after the cells have been altered to produce a desired function, the spare cells may be substituted for the defective cells while the deleterious effects on the defective cells are eliminated. Thus, neither the cellular array nor the effort required to alter it in producing the desired function is wasted, even though faulty cells are not discovered until the array is about to be connected into a computer or other device.

In another embodiment of the invention, each cell, rather than having its input ports directly connected to input and output ports of other cells in the array, includes an arrangement whereby the variables supplied thereto are selectively supplied from any one or more of five input ports. Also, the output of each cell, rather than being directly connected to one input port of a lower cell in a functional column, is selectively connected to as many as three adjacent cells. Thus, the various cells can be selectively intercoupled in any one of a great many combinations, hereafter referred to as cobweb arrangements, so that certain output functions can be produced with a minimum of cells. When employing the cobweb arrangements, several cells may be combined to comprise a composite cell. If one of the cells in the composite cell is found to be defective after the array is constructed, the defective cell can be replaced by another of the cells in the composite cell so that the desired output function of the array may be produced.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a block diagram representation of a cellular array of cutpoint cells constructed in accordance with the invention;

FIGURES 1A and 1B show alternative arrangements for performing logical functions specified for FIGURE 1, using functions specified in the table shown in FIGURE 3;

FIGURE 2 is a block diagram of a cellular array for producing the same function as is produced by the circuit of FIGURE 1, but wherein a different set of functions is employed, and wherein no specially oriented collector cells are employed;

FIGURE 3 is a table of seven functions for use in the cellular arrays of this invention, six of the functions constituting one of the sixty-four combinations of six functions each which may be employed in each array;

FIGURE 4 is a block diagram of a cellular array constructed in accordance with the invention, for producing three functions of three variables;

FIGURE 9 is a circuit diagram of a cell useful in the cellular array of the invention, which may be converted to a flip-flop device in addition to one of seven logic functions;

FIGURE 10 is a table of functions, showing the functions of the cell of FIGURE 9 for various provisions of the switches thereof;

FIGURE 11 is a block diagram of a cellular array altered so as to form an Add One circuit which provides an output in binary-coded form of a number greater by one than the input therein;

FIGURE 12 is a block diagram of a cellular array altered so as to form a shift register, several of the cells thereof being flip-flops;

Figure 5:
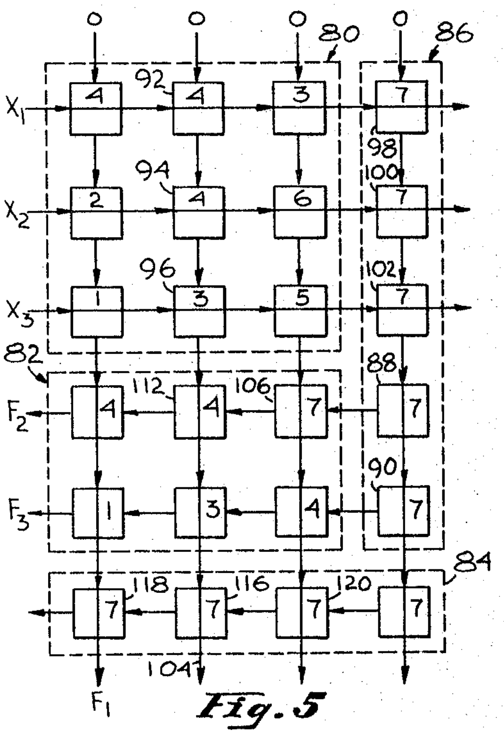
FIGURE 5 is a block diagram similar to the array of FIGURE 4, to which has been added one row and one column of spare cells.

Reference is now made to FIGURE 1 which shows a block diagram of one embodiment of a simple cellular array of eight cells constructed in accordance with the invention, for producing a function of three variables $X_1$, $X_2$, and $X_3$. The cells may be divided into three groups: a first functional column of three cells 10, 12 and 14 for producing a first function of the three variables, such as the term $X_3(X_1+X_2)$; a second functional column of three cells 16, 18 and 20 for producing a second function of three variables, such as the term $X'_3(X'_1X_2)$; and a last collector row of cells 22 and 24 for combining the two terms produced by the foregoing columns of cells to obtain any function of the three variables such as $X_3(X_1+X_2)+X'_3(X'_1X_2)$.

Each cell of the array of FIGURE 1, such as cell 10, comprises a first or "X" input 26, a second or "Y" input 28, and an output 30. The output 30 is a binary logic function of the inputs at 26 and 28. Generally there are sixteen possible functions of two binary variables, but only six of these are required to produce any function of a number of variables. If a cell is specialized to one of a particular set of six functions, a cellular array with this interconnecting geometry has the maximum generality. For convenience, an additional function is employed so that a total of only seven functions are utilized in any cellular array of this invention, as will be more fully explained hereinafter.

The cells of FIGURE 1 are arranged in two columns and four rows. Generally, the first or X input of all cells in a row are connected or "bussed" together; thus, the input $X_1$ is delivered to both cells 10 and 16. The cells in each column are generally series connected whereby the output of one cell constitutes the input to the next lower cell in the column; thus, output 30 of cell 10 is the "Y" input to cell 12. The cells 22 and 24 in the last or collector row, are turned 90°; that is, they are series connected (instead of bussed) to the cells in the same row.

The cells in each functional column such as the cells 10, 12 and 14 are similar to what is generally termed a Maitra cascade. This is shown and described in an article entitled "Cascaded Switching Networks of Two-Input Flexible Cells," published in IRE TEC, EC11, No. 2, pp. 136–143 (April 1962). A Maitra cascade is an array of cells as in a column, each cell having two inputs, "X," and "Y," and one output, for producing any of a number of functions of the input variables, $X_1$, $X_2$, $X_3$, . . . $X_n$. The connection is the same as the interconnection of the cells 10, 12 and 14. Each of the inputs and outputs are binary and may be expressed as 0 or 1. The X inputs to the cells are input variables $X_1$, $X_2$, . . . $X_n$, and the Y inputs to each cell other than the first is the output of the preceding cell. The function of each cell may be chosen from among the sixteen possible functions of two variables, to obtain the various functions of many input variables. Although the Maitra cascade cannot produce all of the functions of an arbitrary number of input variables $n$ using a cascade of $n$ cells, it is useful in producing many of them. Furthermore, a limited number of Maitra cascades, and the like, connected in a predetermined manner, generally can be used to obtain any desired arbitrary function of $n$ variables by the construction of this invention.

Although Maitra cascades can be used to obtain the cellular arrays of this invention, this invention provides a simpler cascade herein termed a "restricted Maitra cascade" which can produce all of the functions which can be produced by a Maitra cascade, and which may be used in its place. The restricted Maitra cascades, generally used in this invention, employ cells which can be altered to perform any one of six functions, instead of the sixteen functions which may be specified for each cell in an ordinary Maitra cascade. The cells of the restricted Maitra cascade are termed "cutpoint cells" to indicate that each cell may be individually altered, often by cutting wires in the cell.

The invention is generally employed to construct standard arrays of output cells. When a certain function of a number of variables, such as $X_1$, $X_2$, and $X_3$ is required, each cell in the standard array is altered, as by cutting wires, and the standard array then produces the required function.

As previously mentioned, each restricted Maitra cascade used in the arrays of this invention need employ cutpoint cells which are alterable so as to perform only one of six functions instead of the total of sixteen possible functions of two input variables. The six functions which must be producible by altering each cutpoint cells are chosen from the following six sets; one function chosen from the two choices in each set:

$Y'$ or $Y'$ $X'+Y'$ or $X'+Y$;

$X'Y'$ or $X'Y'$;

$X+Y$ or $X+Y'$;

$XY'$ or $XY$; and $X\oplus Y$ or $X\oplus Y'$.

Thus, there are sixty-four combinations of six functions, each which may be employed instead of using the foregoing list of six sets as a definition. The six functions of each cell in the cascade of two-input and one-output cells, wherein the "Y" inputs are generally series connected to the outputs and "X" input variables are bussed to several cells in a row, may be defined as follows:

- a one-term function of the Y input terms;
- an "or" function of the complemented X input term;
- an "and" function wherein the X input term is complemented;
- and "or" function of the uncomplemented X input term;
- an "and" function wherein the X input term is uncomplemented; and
- an "exclusive or" function of the uncomplemented X input term.

By constructing each cutpoint cell so that it can be altered to produce any one of the foregoing six types of functions, a restricted Maitra cascade of cutpoint cells is produced.

The standard arrays of cutpoint cells of this invention may be used in applications wherein more cells are included than are actually required in a desired application, and the total number of cells is not utilized. Accordingly, it is convenient to eliminate any interference from the cells which are not being used, by providing an additional function such as 0 or 1 which each cell can be set to produce. Generally, it is convenient to provide arrays wherein every cell produces the function 0 unless it is altered to produce one of the other functions.

One possible set of functions for a cutpoint cell is given in the table of FIGURE 3, wherein each function is identified by a number 0, 1, 2, 3, 4, 5, 6 and 7. Each function is given in terms of two inputs X and Y to the cell. For the cutpoint cells shown in the drawings, the input which is bussed through the cell for enabling its application to another cell is the "X" input, while the other input to the cell is the "Y" input. The functions of FIGURE 3 are used in the arrays shown in the other figures except FIGURES 1 and 2.

The interconnection of the restricted Maitra cascade is basically as shown in FIGURE 1. The cascades are arranged beside one another so that each cascade, such as the combination of cells 10, 12 and 14, forms a function producing column of cells, and the cells of adjacent cascades form rows. The same X input variables $X_1$, $X_2$ or $X_3$ is delivered to all cells of the same rows so that each cascade operates on the same variable. A collector row such as the row comprising cells 22 and 24 in FIGURE 1, is connected to the output of the cascades to combine their outputs and produce a function thereof.

Functions may be produced by the arrays of this invention in ways which are similar to their manners of statement. One basic way of expressing a function is as the sum of minterms, or in other words, a group of terms connected by an "or" symbol as, for example, the expression $X_3(X_1+X_2)+X'_3(X'_1X_2)$ produced by the array of FIGURE 1. A straightforward way of producing this function is as indicated by the array of FIGURE 1 wherein the cells of each cascade are set to produce the two major terms, $X_3(X_1+X_2)$ and $X'_3(X'_1X_2)$ of the expression. A row of collector cells 22 and 24 is altered or "set" to combine the terms in accordance with the "or" function. In the array of FIGURE 1, functions are chosen for each cell so as to produce the terms of the functions in a simple manner. Since, as previously explained, the Y input to each cell is the output of a preceeding cell, the output of cell 10 is X, since it performs the function XY; whose X input is X, and Y input is zero. Cell 12, which is assigned the function $X+Y$, provides an output $X_1+X_2$, since its X input is $X_2$ and its Y input is $X_1$. From this explanation, it should be apparent how the arrangement shown in FIGURE 1, as well as the succeeding arrangements, operate. When a number of possible functions of each cell is restricted as, for example, to the seven functions in the table of FIGURE 3, the complements of each term may have to be dealt with.

FIGURE 1A shows an arrangement of cells which is identical to that shown in FIGURE 1 and which performs the same overall logical function as is performed by the structure shown in FIGURE 1. However, the function of each cell here is selected from the functions listed in FIGURE 3. FIGURE 1B illustrates an arrangement which performs the same overall logical function, with a single column of cells. Here, the function performed by each cell is also selected from FIGURE 3 but repeated variables X'Y' and X⊕Y are used in the arrangement shown.

The collector row of FIGURE 1, comprising cells 22 and 24 which are turned 90°, can be eliminated by the arrangement of FIGURE 2. The circuit of FIGURE 2 utilizes cells with functions chosen from the table of FIGURE 3, each block representing a cell having a number placed within the block which represents the corresponding function of the table. In FIGURE 2, the output term of cell 34 is delivered by connector 32 to the X input of cell 34 and thus to adjacent cell 36. The use of the connector 32 to eliminate collector rows which are turned 90°, is useful where there is a small number of terms to be combined with an "or" between them (OR combined), or where the output of one column can be used as an input to several of the columns.

The cellular array of this invention may sometimes be efficiently utilized to produce several functions which contains several terms in common. For example, the following functions $F_1$, $F_2$ and $F_3$ are produced by the array of FIGURE 4, where $F_1=X_1X_2$;

$$F_2=X_1X_2+X'_1X_2X'_3; \text{ and}$$

$$F_3=X'_1X'_2X'_3+X_3(X_1\oplus X_2)$$

In the array of FIGURE 4, the first cascade comprising cells 50, 52 and 54 produces the term $X_1X_2$, the second cascade of cells 56, 58 and 60 produces the term $$X'_1X'_2X'_3$$

and the third cascade of cells 62, 64 and 66 produces the term $X_3(X'\oplus X_2)$. The function $F_1$ is the output of the first cascade, which is bussed directly to the output of cell 70. The function $F_2$ is obtained by OR combining (combining two terms with the "or" operation between them) the outputs of the first two cascades in cell 68. It may be noted that the output of the third cascade has no affect on the function $F_2$ because the output of collector cell 76 is 0. The function $F_3$ is obtained by OR combining the outputs of the second and third cascades in cell 74. Here again, it may be noted that the output of the first cascade has no affect on $F_3$ because collector cell 70 is said to produce an output which is not a function of its X input from cell 68.

Very little of the flexibility of the cutpoint cells is required in the collector cells such as cells 68, 70, 72, 74, 76 and 78 in FIGURE 4, when they are used to OR combine terms. Thus, it is generally sufficient to provide collector cells which can be altered only between four functions instead of seven, such as the functions 1, 3, 4 and 7 of the table of FIGURE 3, and simpler collector cells may thus be employed. The flexibility of the first or top cells 50, 56 and 62 may also be limited where the Y input to the cascade is 0, as is the case in many logic applications.

Generally, any function of $n$ input variables (generally labeled X in the figures) can be obtained by an array of $(n+1)2^{n-2}$ individual cells interconnected in the manner shown. However, many functions can be simplified and produced with a fewer number of cells.

The utilization of a large number of cells as a unit gives rise to a considerable possibility that one of the cells in a unit may be faulty. The existence of a faulty cell may not become apparent until it is altered during the setting of the array of cells in which it is a member. Thus, in an array of cutpoint cells wherein each may be altered from the function 0 to one of six other functions, the existence of a fault may not become apparent until the array is completely set. The effort in setting the array as well as its cost of production may then be wasted. This invention provides rows and columns of spare cells which can substitute for defective cells and enable the use of the array in spite of the defects therein. It is assumed that no fault occurs which opens a bussing line such as line 57 in FIGURE 4, or which shorts a bussing line to another potential. These types of faults are rare in integrated circuits.

FIGURE 5 shows an array of cutpoint cells identical to the array of FIGURE 3, to which has been added an additional row 84 and column 86 of spare cells. The array of FIGURE 5 comprises a main array 80 of three restricted Maitra cascades for producing the terms of the desired functions, a collector array 82 for providing the terms to obtain the desired functions $F_1$, $F_2$ and $F_3$, a spare Maitra column 86 and a spare collector row 84. Each of the spare cells in the column 86 and row 84 are normally set to produce function number seven of the table of FIGURE 3, which is the function of output 0. Only the cells 88 and 90 have outputs which are delivered to the main and collector arrays, and even these cells deliver 0. Thus, the spare cells of the column 86 and row 84 do not affect the cellular array when it is functioning normally.

Figure 6:
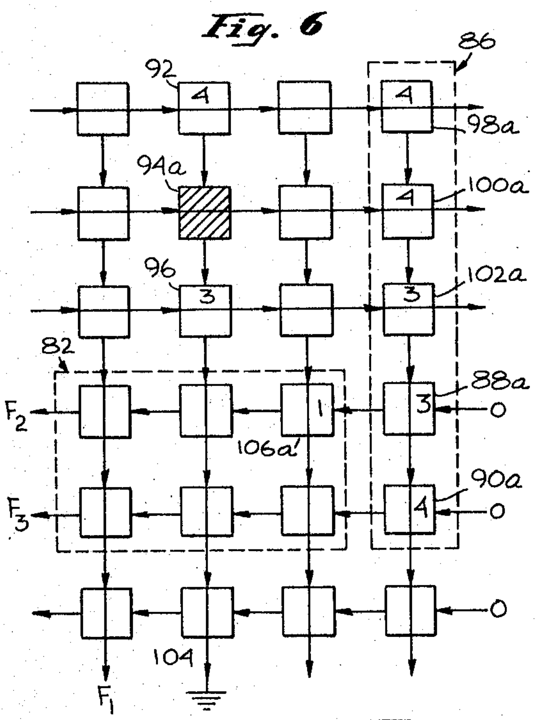
FIGURE 6 is a block diagram similar to the array of FIGURE 5, but having one defective cell in the main array thereof, and wherein the spare cells have been altered to enable the proper functioning of the array in spite of the defect.

FIGURE 6 illustrates the alterations made in the array of FIGURE 5 to correct for a defective cell *94a* of the main array. Basically, a correction is accomplished by grounding the defective Maitra column output to eliminate its effects, altering the spare column 86 to produce the required function, and delivering the output of the spare column to the collecting rows to replace a deleted term of the grounded column.

In FIGURE 6, the correction necessitated by faulty cell 94 is accomplished by first grounding the bussing conductor 104, to delete the term of cell 96 which would have been OR combined with other terms. The cells 98*a*, 100*a* and 102*a* of the spare column are altered to match the settings of cells 92, 94*a* and 96 of the defective column and therefore produce the same function that would have been produced by the defective column. Next, any cells in the collector array 82 which were of functions 7, namely cell 106, are altered to the function 1 as defined in the table of FIGURE 3 (i.e., Y′) so that they transmit the term produced by the spare column 86, and enable it to be OR combined with other terms to obtain the output function $F_2$. Then the spare cell 88*a* is altered to function 3 to enable its transmittal of the term of cell 102*a* to cell 106*a* in complemented form, so that after additional complementing by cell 106*a* the original (uncomplemented) term from cell 102*a* is OR combined to produce the function $F_2$. Cell 90*a* is altered to function 4 to enable the transmittal of the uncomplemented output of cell 102*a* to the function $F_3$. Thus, the same terms appear on the output lines where functions $F_2$ and $F_3$ were obtained in the array which had no defect ($F_1$ was never affected by the fault), and the defect is cured.

Figure 7:
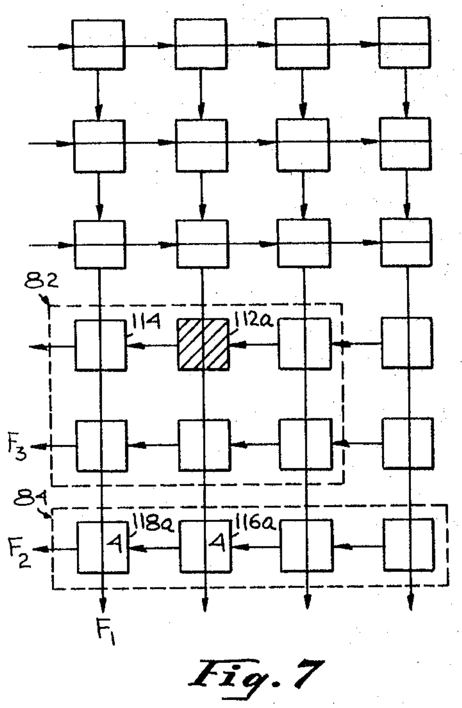
FIGURE 7 is a block diagram of an array similar to the array of FIGURE 5, but having a defective cell in the collector array thereof, and wherein the spare cells have been altered to enable the proper functioning of the array in spite of the defect.

If a defect appears in one of the cells of the collector array 82 of FIGURE 5, such as cell 112, the repair can be made in a manner indicated in FIGURE 7. The cells 116 and 118 of the spare column 84 are altered to the same function 4 to which the defective cell 112*a* and the cell 114 were set. The output function $F_2$ is then taken from cell 118*a* of the spare row 84 instead of from cell 114.

If a fault appears only in a cell of the spare row 84 of FIGURE 5, it can have no effect on the output of the array, since the outputs of the cells in row 84 do not enter any cells from which the functions $F_1$, $F_2$ and $F_3$ are normally derived. If a fault appears in the cells 98, 100 or 102 of the spare column 86, the fault can have no affect of the output of the array, since the outputs of these cells are delivered to spare cell 88 which always has an output of 0. Similarly, if cell 88 is defective, it will have no effect since the output of cell 88 is delivered to cell 106 whose output is always 0.

Figure 8:
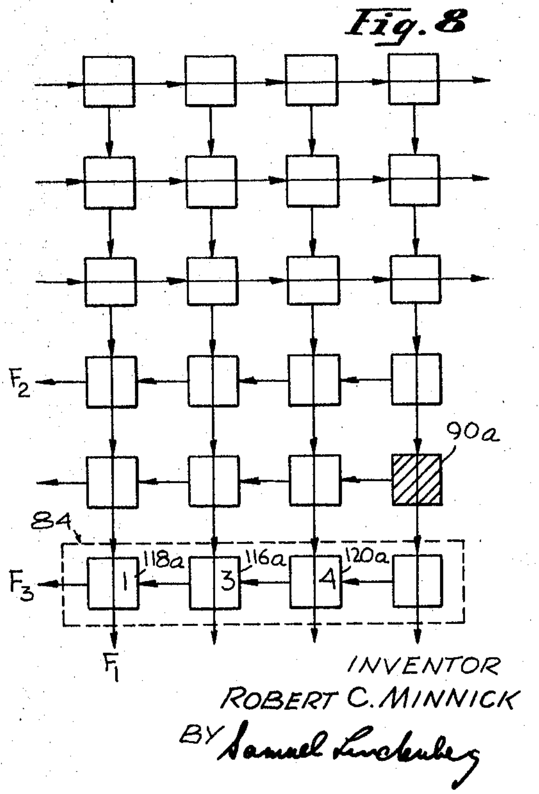
FIGURE 8 is a block diagram of an array similar to the array of FIGURE 5, but having a defective cell in one of the spare cells whose output can affect the output of the array, and showing the alteration of the other spare cells to correct the defect.

If a defect appears in the spare cell 90, it may affect the output of $F_3$. The effect of the fault is eliminated as shown in FIGURE 8 by altering the cells 116*a*, 118*a* and 120*a* of the spare row 84 to match the row from which $F_3$ was originally obtained, and by taking $F_3$ from the spare row 84.

Although only one spare row and column are shown in the foregoing examples, additional spare columns and rows can be added to enable corrections to be made in those cases where more than one faulty cell appears.

The cutpoint cells used in the arrays of this invention may be obtained with various types of circuits, including those employing transistors and diodes. Inasmuch as one of the six required functions, as specified hereinabove, is the exclusive OR or its complement, generally two transistors or other active devices are required in each cell. The provision of two active elements generally enables the conversion of the device to a flip-flop memory device. The circuit of FIGURE 9 exemplifies an embodiment of a cell utilizing transistors and diodes for obtaining any of the functions of the table of FIGURE 3, plus an R–S flip-flop.

Two transistors 122, 124 are employed in FIGURE 9. Switch *a* is the only one of the switches which is single pole, double throw. All the others are single pole, single throw. The zero terminal of switch *a* is connected to the Y input terminal and thereafter to the cathode of diodes 126 and 128. The 1 terminal of switch *a* is connected to the Z output terminal and to the collector of transistor 124. The movable arm of switch *a* is connected to the cathode of diode 130. The anode of diode 130 is connected to a junction with the anodes of diodes 132, 134 and one end of a resistor 136. The cathode of diode 132 is connected to the X input terminal, the swinger arm of switch *c* and the X output terminal which is connected to the X input of the next cell. The other end of resistor 136 is connected to a +5 volt potential source.

A second diode 138 couples the base of transistor 122 to diode 134. A resistor 140 connects the base of transistor 122 to a −5 volt source of bias. The emitter of the NPN transistor 122 is grounded and a load resistor 142 connects the collector to the +5 volt operating potential source.

The collector of transistor 122 is connected, by means of switch *b*, when closed, to the cathodes of diodes 144, 146, 148. Switch *d*, when closed, grounds the cathode of diodes 150, 152. Switch *c*, when closed, connects the X input terminal to the cathodes of diodes 154 and 156.

The anodes of diodes 126, 150 and 144 are connected together and connect to one end of a resistor 158 and the anode of another diode 160. The anodes of diodes 128, 146 and 154 are connected together and to the anode of a diode 162 and to one end of a resistor 164. The anodes of diodes 148, 152, 156 are connected together and to the anode of a diode 166 and to one end of a resistor 168.

Diodes 160, 162 and 166 have their cathodes connected together and to the anode of a diode 170. The base of transistor 124 is connected to the cathode of diode 170, and to a −5 volt bias source through a resistor 172. Resistors 158, 164 and 168 are all connected to the +5 volt potential source as is a resistor 174 which connects to the collector of transistor 124.

As seen, the circuit of FIGURE 9 includes four switches labeled *a*, *b*, *c* and *d*. These may be replaced by wires which are cut as required. For various settings 0 and 1 of these switches, various functions Z of the inputs X and Y may be obtained. The various functions Z obtainable for each of nine settings of the switches are given in the table of FIGURE 10. The functions 0 through 7 are the same as the functions 0 through 7 of the table of FIGURE 3.

By way of illustration of the operation of the arrangement shown in FIGURE 9, assume that it is desired to cause the circuit to perform the function No. 5 or XY′, shown in FIGURE 10. Thus, switches *a* and *c* are placed in the zero positions and switches *b* and *d* are placed in their closed or 1 positions. With the circuit shown, assume a +5 v.=>false (0), and 0 v.=>true 1.

Let the left side of switch *b*, or the collector output of transistor 122 be "*u*," then $u=1$ if base of transistor 122=+5 volts.

Under conditions $b=d=1$, $a=c=0$, the base of transistor 122 is +5 v. unless one or both of (X, Y) is 0 v.; that is, if (X′,Y′) is true so logically $u=X'Y'$.

The base of transistor 124 is +5 volts (and Z is true) if at least one of the three diode groups does not draw current through the load resistor from the +5 volt source. With the *d* switch closed, *c* switch at "0" position and a switch at the "0" position, diodes 150 and 152 are drawing current. Thus only the middle group of diodes determines the voltage at the base of transistor 124.

Now, a +5 volt signal to Y has no affect on the conduction of the middle diode group. Neither does a +5 signal applied from *u*. Thus $Z=Y'u'$, but $u=X'Y'$, therefore $u'=X+Y$, so $$Z=Y'(X+Y)=XY'$$

A general logical equation can be written for the circuit of FIGURE 9 as $$Z=[b'+X+a'y+az][d'y''+cY'+X'Y'+d'X'+c'd']$$

By substituting values for (*a*, *b*, *c*, *d*) the requisite function may be formed.

Although the cutting of wires provides a simple and reliable altering method, other methods may be used. Thus, cutpoint cells may employ photoconductive resistors as switches by selectively illuminating them with a mask or the like, or movable contact switches may be employed.

One example of a useful circuit employing a cutpoint array constructed according to the present invention is the Add-One circuit of FIGURE 11. In this circuit an 8421 binary-coded-decimal digit is to be incremented by one. If the input decimal digit is 9, however, the output is 0 and a carry is generated. In the circuit of FIGURE 11, the four input binary digits required to represent any number of the value of nine or less are labeled $X_1$, $X_2$, $X_3$, and $X_4$, while the four output binary digits are labeled $U_1$, $U_2$, $U_3$, and $U_4$ and the carry output is labeled $U_5$.

The logic required by the Add-One circuit may be given by the following table:

| Input | | | | $U_5$ | $U_4$ | $U_3$ | $U_2$ | $U_1$ |
|---|---|---|---|---|---|---|---|---|
| $X_4$ | $X_3$ | $X_2$ | $X_1$ | | | | | |
| 0 | 0 | 0 | 0 | 0 | 0 | 0 | 0 | 1 |
| 0 | 0 | 0 | 1 | 0 | 0 | 0 | 1 | 0 |
| 0 | 0 | 1 | 0 | 0 | 0 | 0 | 1 | 1 |
| 0 | 0 | 1 | 1 | 0 | 0 | 1 | 0 | 0 |
| 0 | 1 | 0 | 0 | 0 | 0 | 1 | 0 | 1 |
| 0 | 1 | 0 | 1 | 0 | 0 | 1 | 1 | 0 |
| 0 | 1 | 1 | 0 | 0 | 0 | 1 | 1 | 1 |
| 0 | 1 | 1 | 1 | 0 | 1 | 0 | 0 | 0 |
| 1 | 0 | 0 | 0 | 0 | 1 | 0 | 0 | 1 |
| 1 | 0 | 0 | 1 | 1 | 0 | 0 | 0 | 0 |

The logic of the Add-One circuit may also be given by the following equations:

$$U_1=X'_1;$$
$$U_2=X'_4(X_2\oplus X_1);$$
$$U_3=X_3\oplus X_2X_1;$$
$$U_4=X_1X_2X_3\oplus X'_1X'_2X'_3X_4, \text{ or}$$
$$U_4=U'_3U'_2(X_4\oplus X_1);$$
$$U_5=X_4X_1$$

Although no spare cells are included in FIGURE 11, an additional row and column may be added to correct for any defects.

Another example of a useful circuit employing a cutpoint array constructed according to the invention is the Shift Register of FIGURE 12. This circuit employs the well-known R–S flip-flops (reset-set) wherein the horizontal or X inputs are the set S inputs and the vertical or Y inputs are the reset R inputs. The R–S flip-flops are indicated by the function setting 13, and can be obtained by the cells of the type shown in FIGURE 9. Clock signals $t_1$, $t_2$, $t_3$ and $t_4$ are delivered to the indicated inputs of the array in the order $t_1$, $t_2$, $t_3$ and $t_4$. $Y_i$ represents the initial input to be registered, this input being entered into the circuit during the occurance of the $t_2$ clock pulse. At time $t_1$, all the cells in the row of cells 202 are set to deliver an output of 1. At time $t_2$, a true input $Y_i$ causes the output of cell 200 to be 0 and thus the output of cell 202 to continue as one. A false input $Y_i$ causes the output of cell 200 to be 1, and hence the output of cell 202 is reset to zero. At time $t_3$ the row of cells 206 are set to 1. At time $t_4$, if the control input $Y_i$ was true, the output of cell 204 is then zero and cell 206 continues as 1 until the end of the next period of four pluses. If the control input $Y_i$ was false, the output of cell 204 at time $t_4$ is 1 and cell 206 is reset to 0. Thus, for an input $Y_i$ of 1 at time $t_2$, the shift register delivers an output of one after pulse $t_4$. The output $Z_2$ of cell 206 is similarly shifted through other stages of the register. It may be noted that a spurious output signal may occur at time $t_3$ (which is eliminated at time $t_4$ if it is spurious).

Although various examples of arrays of cells have been shown, many other configurations may be made. The arrays usually comprise operational columns of restricted Maitra cascades for producing the terms of the desired functions and operational rows of collector cells for combining the terms. Often the collector rows are turned 90° or, in other words, they are made to deliver their outputs to adjacent cells in the same row; however, other arrangements, such as those illustrated in FIGURES 2 and 11 may be employed instead. For greater versatility, the Maitra cascade columns may be incorporated in arrays which are separate from other arrays of collector rows, and the two of them amy be connected together to produce the desired functions. Similarly, the columns and rows of spare cells may be added to arrays only after a faulty cell is discovered, in order to enable the use of a smaller array or arrays of the smallest size which will suffice. Generally, however, the advantage of the arrays constructed in accordance with the invention is that a limited number of standard arrays can be used in a great variety of applications, and the waste involved in providing more than the required number of cells in most applications is compensated for them by the great savings in standardization.

In the foregoing description, the teachings of the invention have been described in connection with an array in which each cutpoint cell has only two input ports (X and Y) and an output port Z. The X inputs of all cells in a row are bussed together and the Z output of each cell connected as the Y input to a lower cell in the same column. Such an arrangement has been found to be quite satisfactory in producing many desired output functions. However, in some applications where parallel logic functions are to be produced of multibit variables, the fixed connections between cells are not particularly desirable. For example, to perform a bit-by-bit exclusive-OR function on two *n*-bit words, a square array of $n^2$ output cells is necessary, even though only *n* cells on the major diagonal of the array actually perform the required logic function.

Figure 13:
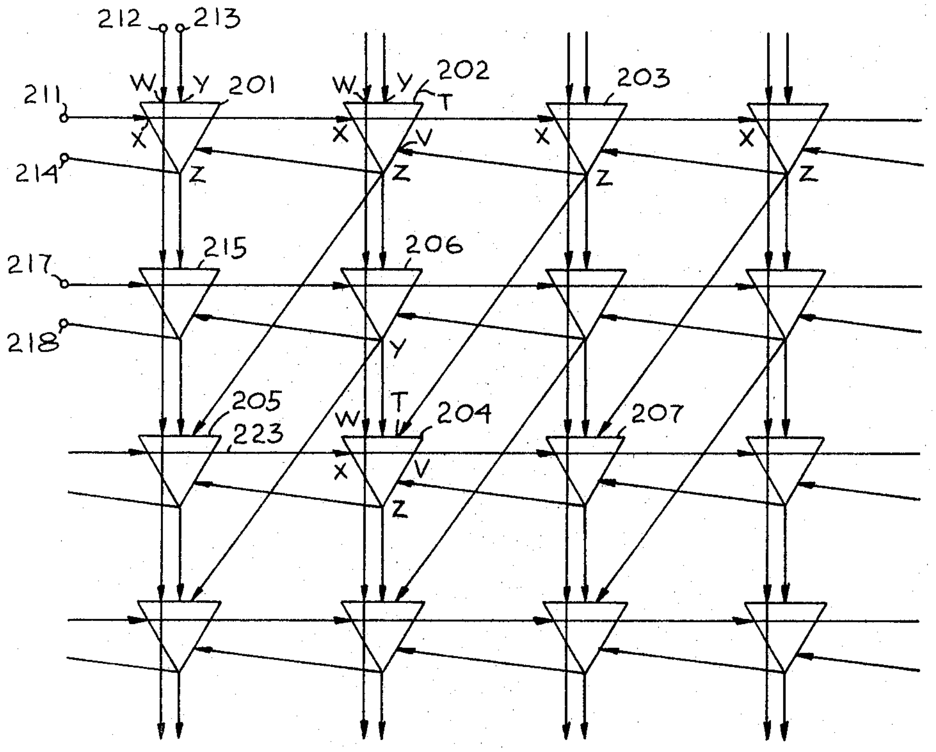
FIGURE 13 is a cobweb cellular array constructed in accordance with another embodiment of the invention.

The occasional need for an array with a large number of cells in which only a few cells produce the desired function is minimized by incorporating the cells in a manner diagrammed in FIGURE 13 to which reference is made herein. As seen, the cells are arranged in columns and rows as herebefore described. However, in addition to bussing the X inputs of all the cells in a given row, and connecting the Z output of each cell to the Y input of each lower cell in each column, each cell is provided with as many as three additional inputs, and the Z output is suppliable to two additional cells.

In FIGURE 13, each cell in the four-by-four array is represented by a triangle. Each cell, such as cell 202 in the first row, second column, in addition to the X and Y inputs, has a W input port directly connected (bussed) to the W input ports of the other cells in the same column. Also cell 202 is provided with an input port V which provides it with the Z output of a cell 203 in the same row but in a succeeding column in the array. Cell 202 may further be provided with an input port T which is connected to the Z output port of a cell which is in the same column as cell 203 but in two rows above it. The connection is similar to the input port T of a cell 204 connected to the Z output port of cell 203 in a succeeding column and in two rows above it. Such a connection can be thought of as a knight's move.

From FIGURE 13, it is seen that in an array of a fixed number of cells as the four-by-four array, each corner cell, such as cell 201, has both busses X and W, at least one non-bussed input such as input Y and possibly the output Z connected to external array terminals 211, 212, 213 and 214 respectively. Other edge cells, such as cell 215, have at least a bussed input such as the X input connected to an external array terminal 217, and the Z output connected to a terminal 218. Due to the increased number of input and output connections, hereafter such cells will also be referred to as cobweb cells, and the array described as a cobweb array.

As previously explained, each of the cells is designed to perform a logic function on not more than two input variables herebefore designated as X and Y. Thus, in the present embodiment of the invention in which each cobweb cell can be provided with an input on any one of five input ports, each cell in addition to the circuitry shown in FIGURE 9, also incorporates a switching circuit which is used to select not more than two inputs to each cell. As seen from FIGURE 14, each cell, such as cobweb cell 204, comprises a logic stage 220 in which the selected logic function is performed. The five inputs T, V, W, X and Y are not coupled directly to the stage 220. Rather they pass through a switching circuit 221 which routes any of the inputs to serve as an $I_1$ input or an $I_2$ input of the logic stage 220. The $I_1$ and $I_2$ inputs are analogous to inputs X and Y respectively of FIGURE 9. Thus, for the X input bussed to cell 204 (FIGURE 13) by a line 223 can, by means of circuit 221, be routed to be supplied to stage 220 as an $I_2$ input. Similarly, a Y input from a cell 206 (FIGURE 13) can be routed to the stage 220 as an $I_1$ input.

By incorporating a switching circuit in each cell, the logic stage thereof may be provided with inputs from any one of a variety of sources. Thus, the number of cells which may be required to produce a given function can be held to a minimum. In addition to routing the inputs to the logic stage of each cell through the switching circuit, the Z output thereof is also connected therethrough. This permits one to bypass the stage 220 in any given cell and directly connect any one of the five inputs to the Z output. When so operated, the cell does not perform logic functions but can be thought of as providing a jumpering terminal for rerouting input variables to adjacent cells. Also any two or more inputs may be directly connected to one another in the switching circuit of a cell as will be further demonstrated hereafter.

Figure 14:
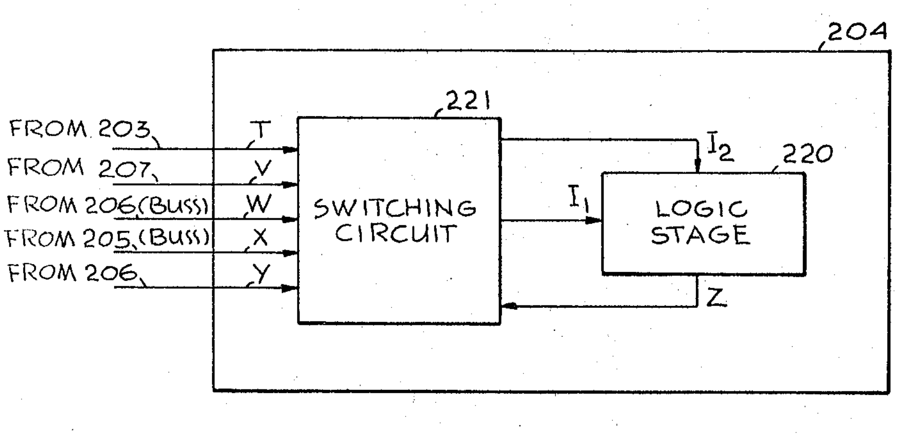
FIGURE 14 is a simplified block diagram of a cobweb cell of the present invention.
Figure 15:
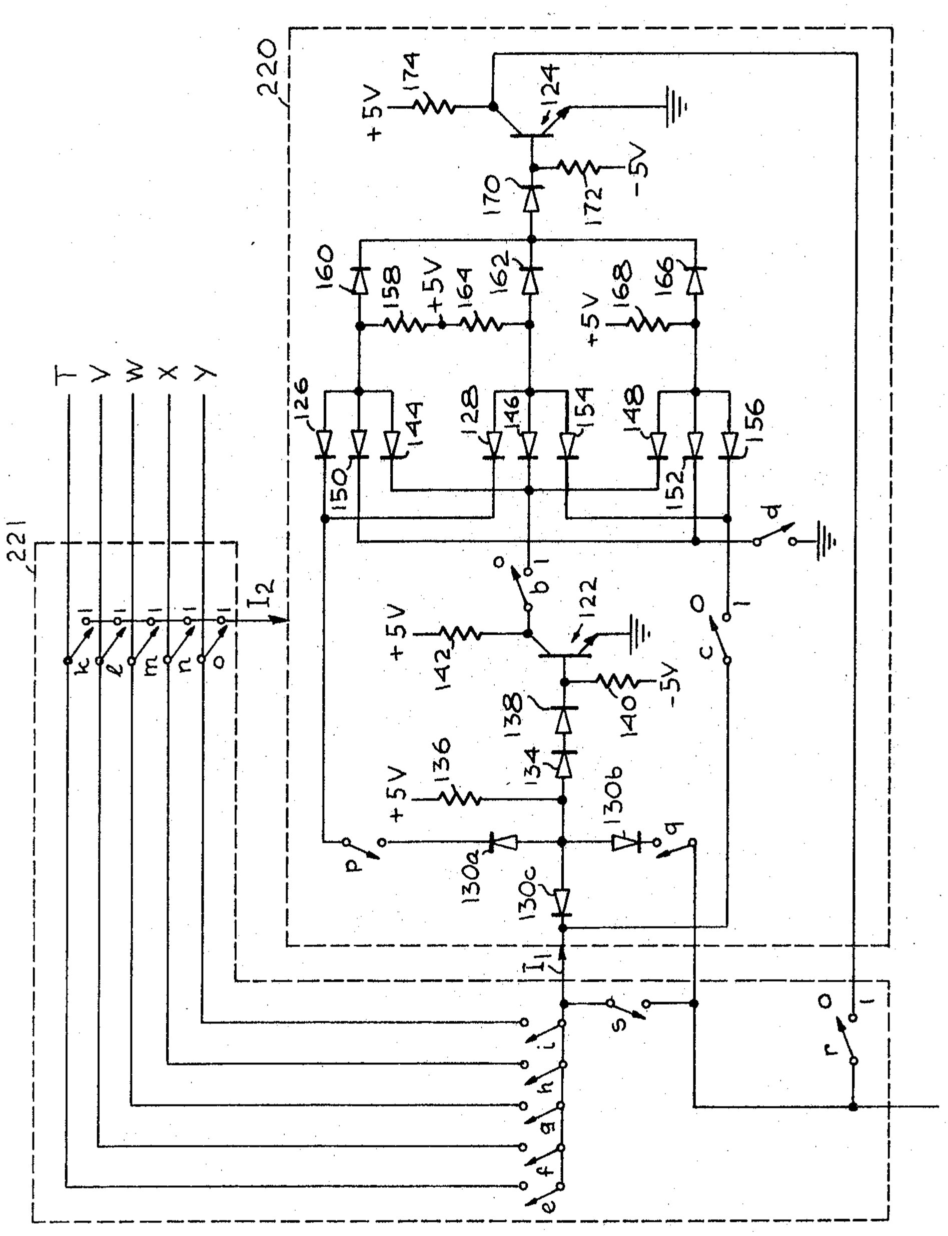
FIGURE 15 is a schematic circuit diagram of a cobweb cell.

For a better understanding of the present invention, reference is made to FIGURE 15 which is a circuit diagram of each of the cobweb cells shown in FIGURE 13, such as cell 204. By comparing FIGURES 15 and 9, it is appreciated that the circuitry in both figures required to perform the logic operation is identical, with like elements being designated by like numerals. The entire circuit of FIGURE 9 comprises logic stage 220 (FIGURE 14). However whereas in FIGURE 9, inputs X and Y are fixedly connected to the logic circuitry, in FIGURE 15, input $I_1$ is connected to the movable arms of switches *e* through *j* which are connectable to inputs T, V, W, X and Y respectively when they are in their one position. Similarly input $I_2$ is connected to the zero terminals of switches *k* through *o* so that any one of the five inputs may be supplied to the logic stage 220 when one of switches *k* through *o* is in its one position. In stage 220, switches *p* and *q* replace switch *a* (FIGURE 9) and diodes 130*a* and 130*b* are substituted for diode 130 so that switch *a* in position zero is accomplished by closing switch *p*, and "*a*" in position one is accomplished by closing switch *q*.

The switching circuit 221, in addition to switches *e* through *o*, also includes switches *r* and *s*. When switch *r* is opened and switch *s* closed, any one of the inputs may be directly connected to the Z output by selectively closing one of switches *e* through *j*. A diode 130*c* isolates the stage 220 when any of the inputs is directly routed to the Z output. Under such conditions, the cell does not perform logic operation, but acts a jumpering terminal to reroute any of its inputs to the three cells to which its output is generally connected.

Also, switching circuit 221 may be used to jumper any of the inputs together. For example, by closing switches *e* and *f*, inputs T and V are connected together. At the same time, any of the three other inputs (W, X and Y) may be jumpered together by closing any of switches *m*, *n* and *o*.

Figure 16:
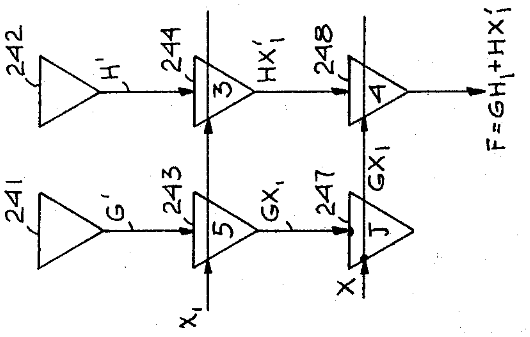
FIGURE 16 is a diagram of a simplified cobweb array used to exemplify the advantages of the array in producing a particular function.

The advantages realizable by the cobweb cell structure shown in FIGURE 15 may best be exemplified with a specific example. Let us assume that a desired function $F=GX_1+HX'_1$ is not producible in a single column of cutpoint cells, but that function G′ and H′ each is producible in one column of cells. Then from the foregoing, it is appreciated that a composite or collector row such as the fourth row of FIGURE 2 of cutpoint cells must be employed, to combine the two separate functions, in order to obtain the desired F function. However, when constructing an array with cobweb cells, the need for an additional row of cells can be eliminated. As seen from FIGURE 16, let it be assumed that the output of cobweb cells 241 and 242 is functions G′ and H′ respectively, and that such functions are supplied to the Y inputs of cobweb cells 243 and 244. The latter cells, having their X inputs bussed together and supplied with the variable $X_1$, perform functions 5 and 3 respectively, (see FIGURES 3 and 10). Their outputs are $GX_1$ and $HX'_1$ respectively. The output $GX_1$ is supplied to the Y input of a cobweb cell 247 which is operated as a jumpering terminal, as indicated by letter J. In cobweb cell 247, the Y and X inputs are connected together by positioning either switches *i* and *j* or switches *n* and *o* to their one positions. Consequently, the function $GX_1$ is supplied to the X input of cell 247 and to the X input of cell 248 which is bussed to cell 247. Thus, cell 248 is provided with function $GX_1$ on its X input and with function $HX'_1$ on its Y input, so that by performing function number 4, the desired function $F=GX_1+HX'_1$ is produced.

From the foregoing description, it should be appreciated that the increased number of inputs to each cobweb cell greatly enhances the interconnection possibilities between cells. In addition to the X and Y inputs which are also present in cutpoint cells, the V input in a cobweb array enables a designer to build up a carry propagation chain among a horizontal row of register cells. The W input which is bussed together with all W inputs of the cells in each column permits one to jumper a bottom cell output of an array to a top cell input. This is easily accomplished by jumpering together the Z output and W input of the bottom cell, so that the Z output becomes available at the W input of each cell including the top cell of the column. Finally, the T input, which is a knight's move away, makes it possible to build up a cascade that crosses over other such cascades or columns.

In addition, the inputs to each of the cobweb cells are not permanently fixed, but rather are selectively chosen. Consequently, it is possible to completely isolate a cobweb cell from the other cells in the matrix by merely keeping all the switches *e* through *o* and switch *r* in the zero positions. Such a feature is highly desirable since it enables the testing of each isolated cell during the early phases of production, so that faulty cells may be identified by the step-and-repeat testing method. This method of testing is widely used by integrated circuit manufacturers.

The ability to selectively choose the inputs to be supplied to the logic stage of each cobweb cell has been found to be most advantageous. As should be appreciated from the foregoing description, each cobweb cell may be controlled to perform any one of the desired functions, as well as serve as a jumpering terminal. The latter property is particularly advantageous because it permits one to use cells within the array for function routing between cells, rather than have to resort to external wiring between array terminals. As seen from line 32 in FIGURE 2 and FIGURE 12, such external wiring is necessary in cutpoint arrays. By reducing the external wiring, the overall complexity of the computer in which the cobweb array is incorporated is greatly reduced.

In the foregoing description of the arrays incorporating cutpoint cells, arrangements were described whereby faulty cutpoint cells in an array are replaceable with cells in a spare column and/or a spare row (see FIGURES 5–8). Such arrangements are not possible in a cobweb array due to the plurality interconnections between adjacent cobweb cells. Therefore, it is necessary to develop a cobweb array structure in which a faulty cell could be replaced by another cell so that the desired output function could be produced even though one or more of the cells are found to be faulty after the array is constructed.

Figure 17:
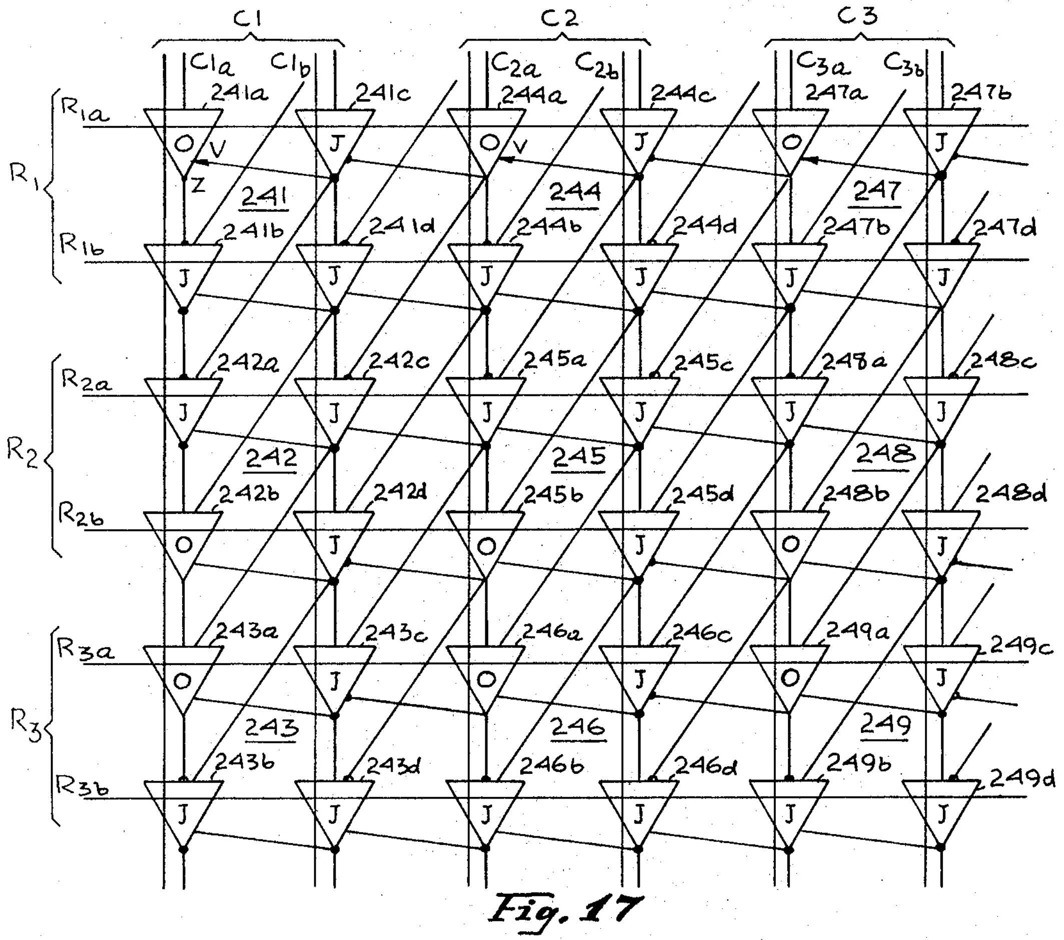
FIGURE 17 is a diagram of a complex cobweb cellular array constructed in accordance with the present invention to produce a desired output function even though one or more cells are defective.

One such cobweb array is shown in FIGURE 17 to which reference is made herein. As seen, the array comprises nine composite cells 241–249, arranged in three composite columns $C_1$, $C_2$ and $C_3$ each of two columns designated by subscripts *a* and *b*, and three composite rows R1, R2, and R3, each of two rows designated by subscripts *a* and *b*. Each of the composite cells, such as cell 241, comprises four standard cobweb cells designated by subscripts *a*, *b*, *c*, and *d* such as 241*a*, 241*b*, 241*c*, and 241*d*, the four cells being arranged in a two-by-two subarray. In each composite cell in each odd row, such as rows R1 and R3, the top left hand cell is the operative cell connected to perform the necessary function. The operative cell is indicated by the letter O. The other three cells in each composite cell serve as jumpering terminals and they are indicated by the letters J. In each even row, such as row R2, the bottom left hand cell, such as cell 242*b* in each composite cell, is the operative cell while the other cells act as jumpering terminals.

If after constructing the cobweb array, all the operative cells (indicated by O) function properly, then the various cells serving as jumpering terminals may be connected so that effectively the array is reduced to a three-by-three operative array of standard cobweb cells. The circles at the inputs or output of each J cell indicate the two lines which are connected or jumpered together at the particular cell. Thus, the Z outputs of cells 241*a*, 244*a* and 247*a* are directly applied to the Y inputs of cells 242*b*, 245*b* and 248*b* respectively. Similarly, by the particular manner in which cells 241*c*, 244*c* are jumpered together the Z outputs of cells 244*a* and 247*a* are directly applied to the V inputs of cells 241*a* and 244*a* respectively.

Figure 18:
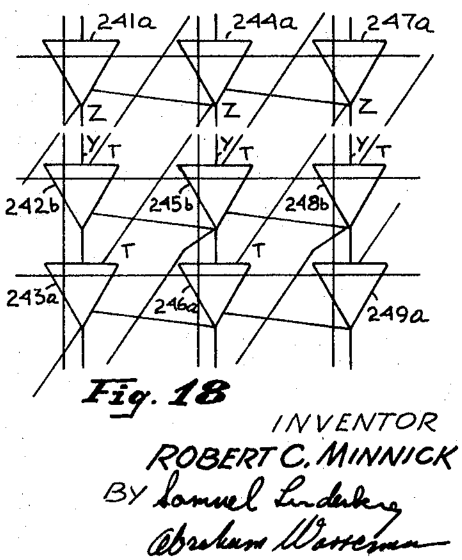
FIGURE 18 is a diagram of a reduced cobweb array useful in explaining the operation of the array of FIGURE 17.

From the foregoing, it should be appreciated that the composite array of FIGURE 17 may be reduced to an array as shown in FIGURE 18 in which only the operative cells are shown. Thus, the use of composite cells allows one to embed one cobweb array into another cobweb array which is four times as large. As long as the operative cells function properly, the smaller array (FIGURE 18) can be used undisturbed. However, if one of the operative cells in a composite cell is found to be defective, it could be replaced by another of the cells in the same composite cells. An analysis of the composite array structure and the composite cells indicates that a faulty operative cell in a composite cell in an odd row can be corrected if the nearest correct fault in the row of the given fault is at least three composite cells away in either direction, and that the nearest corrected fault in the row of the composite cells below the given fault is one composite cell to the right and two composite cells to the left. The analysis statement when read backward holds true for the possible corrections of operative cells in the composite cells in even numbered rows.

It is to be appreciated that the ability to replace the operative cell with another cell within each composite cell is not limited to the specific arrangements herebefore described. Other multi-cell cobweb arrays may be constructed so as to enable one to replace a defective operative cell with another cell so that the desired output function could be produced despite the defective cell.

Figure 19:
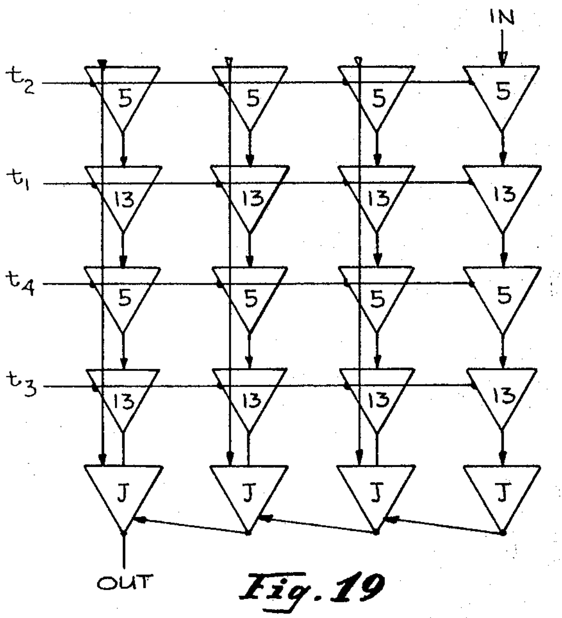
FIGURE 19 is a block diagram of a cobweb array constructed to form a four bit shift register similar to the register of FIGURE 12.

Reference is now made to FIGURE 19 which is a cobweb array constructed in accordance with the present invention designed to operate as a four-bit shift register. The register is similar to that of FIGURE 12 with the numbers 5 and 13 in the cells indicating that the particular cells produce functions 5 and 13 of FIGURE 10. The $J^s$ in the cells of the last row indicate that the cells serve as jumpering terminals. In each operative cell (5 or 13) the triangle indicates that the particular input is connected to the $I_2$ input of the logic stage of the cell (FIGURE 15) whereas the input with the circle indicates that it is connected to the $I_1$ input. In the J cells, the connections with the circles are jumpered together and those with triangles are separately jumpered together. Thus, for example, in the last cell of the second column, the W and V inputs are connected and the Y input is separately connected to the Z output. In FIGURE 19 are shown only the necessary cell interconnections.

The input to the four-bit register is supplied to the Y input terminal of the first cell in the last column and the output is received from the Z output of the last cell in the first column. The clock pulses $t_1$ through $t_4$ are supplied to the X inputs of the second, first, fourth and third rows respectively, in a manner similar to that described in conjunction with FIGURE 12.

By comparing FIGURES 12 and 19, it becomes apparent that the cobweb structures shown in FIGURE 19 eliminate the need for external leads (FIGURE 12) which are necessary to connect the bottom cells of several of the columns to the top cells of other columns. The elimination of the external leads greatly reduces the complexity of external wiring as well as reduces the number of external terminals which are required. Since the number of external terminals is generally quite small, reducing the number of required terminals is highly desirable.

Although particular embodiments of the invention have been described in detail, many further modifications may be employed without departing from the spirit and scope of the claims which follow herein.

What is claimed is:

1. A function device comprising:

a plurality of function elements arranged in operational rows and columns, each of said elements including two input ports for receiving input binary signals and an output port for producing a binary output signal;

a plurality of row bussing means, each of said bussing means connecting together one input port of each function element of an operational row thereof;

a plurality of column series connectors, each of said series connectors connecting an output of one of said function elements to an input port of another function element in an operational column thereof; and function changing means included in each function element for altering the functional output of the element thereof in response to the two input binary signals received thereby.

2. A function device as defined in claim 1 including: an operational row of collector cells having first and second input ports and an output port;

a plurality of collector cell conductors, each of said cell conductors series connecting an output port of a collector cell to a second input port of another collector cell in the same row of collector cells; and a plurality of collector cell bussing means, each of said collector cell bussing means connecting the first input of a collector cell to the output of a row of said function elements.

3. A logic device as defined in claim 1 wherein said function changing means include:

altering means incorporated in a plurality of said function elements for altering the binary function of said elements from a predetermined initial state, to one of at least five other states, said initial and five other states being those which produce, as a function of a "X" input and a "Y" input;

a one term function of the Y input term;

an "or" function of the complemented X input term;

an "and" function wherein the X input term is complemented;

an "or" function of the uncomplemented X input term;

an "and" function wherein the X input term is uncomplemented; and an "exclusive or" function of the uncomplemented X input term.

4. A logic device as defined in claim 3 wherein:

each function element is in a state which produces an output of zero, whereby those cells which are not altered in causing the device to produce a desired function have no effect on the other cells.

5. A function device comprising:

a plurality of Maitra-like cascades of cells arranged in operational columns for producing a plurality of logic terms, said Maitra-like cascades operationally arranged beside one another so as to produce rows of cells wherein each row includes a cell from a different Maitra-like cascade;

bussing means for connecting together a first input port of the cells in each of said rows; and function altering means for altering the output function characteristics of a plurality of said cells.

6. A function device as defined in claim 5 including:

a row of collector cells series connected together, each cell thereof having an input port connected to the output port of a different Maitra-like cascade.

7. A function device as defined in claim 5 including:

a plurality of rows of collector cells, each row thereof series connected together, and an input port of one cell in each row of collector cells bussed together and also connected to the output port of a different Maitra-like cascade.

8. A function device as defined in claim 6 wherein:

a majority of said cells in said Maitra-like cascades are alterable to one of at least six binary function states of a first X variable and a second Y variable;

one of said states creating a one term function of the Y input term;

another of said states creating an "exclusive or" func- complemented X input term;

another of said states creating an "and" function wherein the X input term is complemented;

another of said states creating an "or" function of the uncomplemented X input term;

another of said states creating an "and" function wherein the X input term is uncomplemented; and another of said states creating an "exclusive or" function of the uncomplemented X input term.

9. A function device comprising:

a plurality of main binary function cells each having a first input port, a second input port and at least one output port, arranged in an array of operational columns and rows, wherein the first input ports of the cells of each row are bussed together and said second input ports and at least one output port of the cells in each column are series connected together; and function altering means included in each cell for individually changing the functional characteristics thereof.

10. A function device as defined in claim 9 wherein:

the output of each of said cells is a function of a first input variable and a second input variable, each cell containing three switching means, whereby the functional output of said cell is alterable between eight states, one of said eight states producing an output of zero, and another of said eight states producing a memory function, the other six states producing logic functions of restricted Maitra cascade cells.

11. A function device as defined in claim 9 including:

at least one row of collector cells, each collector cell having first input ports connected to the output ports of a different one of said columns of main cells and each of said collector cells having output ports and second input ports series connected together.

12. A function device as defined in claim 11 including:

a column of spare cells, including a plurality of spare cells having first input ports bussed to the input ports of said main cells and second input ports and output ports series connected, and at least one cell having an output port connected to an input port of one of said collector cells; and a row of spare cells, each having first input ports bussed to a different one of said first input ports of said collector cells and having second input ports and output ports series connected together, each of said spare cells normally in a configuration wherein its output is zero.

13. A function device as defined in claim 9 wherein:

each cell includes three wires and is constructed so that the cutting of different combinations of the wires causes the cells to produce a different function output of its two inputs.

14. A function device comprising:

a plurality of function elements arranged in operational rows and columns, each of said elements including input ports for selectively receiving input binary signals and an output port for supplying an output binary signal;

a plurality of row bussing means, each of said row bussing means connecting together one input port of each function element of an operational row thereof;

a plurality of column bussing means each of said column bussing means connecting together one input port of each function element of an operational column thereof;

a plurality of row series connectors, each connecting an output port of one of said function elements to an input port of another function element in the same operational row;

a plurality of column series connectors, each connecting an output port of one of said function elements to an input port of another function element in an operational column thereof;

a plurality of cross-column series connectors, each connecting an output port of one of said function elements to an input port of another function element in a different column and row; and function changing means for altering the functional output of each of said function elements.

15. A function device as recited in claim 14 wherein said function changing means include:

altering means incorporated in each of said function elements for altering the binary function of said element from a predetermined initial state, to one of at least five other states, said initial and five other states being those which produce, as a function of a first $I_1$ input and a second $I_2$ input;

a one term function of the $I_2$ input term;

an "or" function of the complemented $I_1$ input term;

an "and" function wherein the $I_1$ input term is complemented;

an "or" function of the uncomplemented $I_1$ input term;

an "and" function wherein the $I_1$ input term is uncomplemented; and an "exclusive or" function of the uncomplemented $I_1$ input term.

16. A function device comprising:

a plurality of function elements arranged in rows and columns;

interconnecting means for coupling each element to selected adjacent elements to receive at input ports input binary signals therefrom and supply at an output port an output binary signal thereto;

each element including logic means to produce any one of a set of binary functions of not more than two input binary signals;

altering means for controlling said logic means to produce a particular function of said set of binary functions; and a control means for controlling the supply of the input binary signals received by the input ports of each element to the logic element thereof.

17. A function device as recited in claim 16 wherein said control means included in each element include means for selectively connecting together any of said input ports and said output port.

18. A function device as recited in claim 17 wherein said altering means include means for altering said logic means to produce a set of binary functions of an $I_1$ input and an $I_2$ input, said set including:

a one term function of the $I_2$ input term;

an "or" function of the complemented $I_1$ input term;

an "and" function wherein the $I_1$ input term is complemented;

an "or" function of the uncomplemented $I_1$ input term;

an "and" function wherein the $I_1$ input term is uncomplemented; and an "exclusive or" function of the uncomplemented $I_1$ input term.

19. A function device comprising:

a plurality of function elements arranged in operational rows and columns, each of said elements including a plurality of input ports for receiving input binary signals and an output port for providing an output binary signal;

first means for bussing together one input port of each element of an operational row thereof;

second means for bussing together one input port of each element of an operational column thereof;

third means for connecting input ports of each element to at least the output ports of elements in the same row and column thereof, each element including logic means to produce a function of a set of binary functions, each function being of not more than two input binary signals, each element further including control means for selectively supplying any of the input binary signals at said input ports to said logic means to produce a function thereof, and altering means for controlling said logic means to produce a particular function of said set of binary functions.

20. A function device as recited in claim 19 wherein said third means include means for connecting one input port of each element to the output port of a succeeding element in the same row, means for connecting another input port to the output port of a succeeding element in the same column and means for connecting another input port to the output port of another element in an adjacent column and two rows removed therefrom.

21. A function device as recited in claim 19 wherein said altering means include means for altering said logic means to produce said set of binary functions of a first $I_1$ input and a second $I_2$ input, said set including:

a one term function of the $I_2$ input term;

an "or" function of the complemented $I_1$ input term;

an "and" function wherein the $I_1$ input term is complemented;

an "or" function of the uncomplemented $I_1$ input term, an "and" function wherein the $I_1$ input term is uncomplemented; and an "exclusive or" function of the uncomplemented $I_1$ input term.

22. A function device as recited in claim 21 wherein said set of binary functions include a flip-flop function whereby said logic means is altered to produce a first output when said $I_1$ input to the logic means thereof is a first binary input and a second output when said $I_2$ input is said first binary input.

23. A function device for producing a predetermined output function comprising:

a plurality of composite function elements arranged in a composite array of rows and columns, each composite element comprising a plurality of function elements, each function element including input ports, an output and logic means;

means for interconnecting the input ports and output ports of each of said function elements;

means included in each of said function elements for controlling said logic means to provide a selected output function at the output port thereof as a function of not more than two input signals; and switchable means included in each of said function elements for controlling the elements in each composite function element to produce a desired output function even though one of the function elements included therein is faulty.

24. A function device as recited in claim 23 wherein each of said logic means is controllable to produce any one of a set of functions of two inputs $I_1$ and $I_2$, the set including:

a one term function of the $I_2$ input term;

an "or" function of the complemented $I_1$ input term;

an "and" function wherein the $I_1$ input term is complemented;

an "or" function of the uncomplemented $I_1$ input term;

an "and" function wherein the $I_1$ input term is uncomplemented; and an "exclusive or" function of the uncomplemented $I_1$ input term.

25. A function device as recited in claim 24 wherein each of said function elements includes means for selectively supplying input signals to the logic means thereof from any of the input ports thereof, and for isolating said logic means from said input ports and output port, said means further including means for selectively connecting together any of the input ports and output port.

References Cited by the Examiner

UNITED STATES PATENTS

| | | | |
|---|---|---|---|
| 3,028,088 | 4/1962 | Dunham | 235—164 |
| 3,050,716 | 8/1962 | Andrews | 340—166 X |
| 3,106,637 | 10/1963 | Oliver | 235—175 |
| 3,229,115 | 1/1966 | Amarel | 328—92 X |
| 3,235,842 | 2/1966 | Roth et al. | 340—166 X |
| 3,241,118 | 3/1966 | Domenico et al. | 340—166 |

MALCOLM A. MORRISON, *Primary Examiner.*

M. SPIVAK, *Assistant Examiner.*